(12) United States Patent
Shimizu et al.

(10) Patent No.: US 12,110,391 B2
(45) Date of Patent: Oct. 8, 2024

(54) RESIN COMPOSITION AND MOLDED BODY

(71) Applicant: DOW-MITSUI POLYCHEMICALS CO., LTD., Tokyo (JP)

(72) Inventors: Takahiro Shimizu, Ichihara (JP); Kazuyuki Oogi, Ichihara (JP); Sadaki Yamamoto, Ichihara (JP); Chikara Ichinoseki, Ichihara (JP)

(73) Assignee: DOW-MITSUI POLYCHEMICALS CO., LTD., Tokyo (JP)

( * ) Notice: Subject to any disclaimer, the term of this patent is extended or adjusted under 35 U.S.C. 154(b) by 478 days.

(21) Appl. No.: 17/432,285

(22) PCT Filed: Mar. 13, 2020

(86) PCT No.: PCT/JP2020/011242
§ 371 (c)(1),
(2) Date: Aug. 19, 2021

(87) PCT Pub. No.: WO2020/195979
PCT Pub. Date: Oct. 1, 2020

(65) Prior Publication Data
US 2022/0169848 A1    Jun. 2, 2022

(30) Foreign Application Priority Data
Mar. 26, 2019  (JP) ................................ 2019-058840

(51) Int. Cl.
*C08L 77/06*  (2006.01)
(52) U.S. Cl.
CPC .......... *C08L 77/06* (2013.01); *C08L 2205/03* (2013.01)
(58) Field of Classification Search
CPC .............. C08L 23/0869; C08L 23/0876; C08L 2205/025; C08L 2205/03; C08L 23/04; C08L 23/26; C08L 77/02; C08L 77/06
See application file for complete search history.

(56) References Cited

U.S. PATENT DOCUMENTS

| | | | |
|---|---|---|---|
| 4,485,214 A | 11/1984 | Ochiai et al. | |
| 5,061,757 A | 10/1991 | Warner | |
| 2003/0149175 A1 | 8/2003 | Feinberg | |
| 2013/0172488 A1 | 7/2013 | Chou et al. | |

FOREIGN PATENT DOCUMENTS

| | | | |
|---|---|---|---|
| JP | 54-28360 A | | 3/1979 |
| JP | 58-23850 A | | 2/1983 |
| JP | 58-29854 A | | 2/1983 |
| JP | 58-173154 A | | 10/1983 |
| JP | 59-89353 A | | 5/1984 |
| JP | 59-215352 A | | 12/1984 |
| JP | 60-69159 A | | 4/1985 |
| JP | 2000-154315 A | | 6/2000 |
| JP | 2007138076 A | * | 6/2007 |
| JP | 2007-204674 A | | 8/2007 |
| WO | 2017/073559 A1 | | 5/2017 |

OTHER PUBLICATIONS

JP 2007138076 A machine translation (Jun. 7, 2007).*
International Search Report (ISR) dated May 26, 2020 filed in PCT/JP2020/011242.
Extended European Search Report (EESR) dated Nov. 11, 2022 for European Patent Application No. 20778666.6.

* cited by examiner

*Primary Examiner* — Ana L. Woodward
(74) *Attorney, Agent, or Firm* — RANKIN, HILL & CLARK LLP

(57) ABSTRACT

A resin composition includes: a polyamide resin (A); an ionomer of an ethylene-unsaturated carboxylic acid-based copolymer (B); and an ethylene-based polymer (C), wherein a content of the polyamide resin (A) is 50% by mass or more with respect to a total amount of the polyamide resin (A), the ionomer of an ethylene-unsaturated carboxylic acid-based copolymer (B) and the ethylene-based polymer (C), and wherein a content of the ethylene-based copolymer (C) is less than 50% by mass with respect to a total amount of the ionomer of an ethylene-unsaturated carboxylic acid-based copolymer (B) and the ethylene-based polymer (C).

6 Claims, No Drawings

RESIN COMPOSITION AND MOLDED BODY

TECHNICAL FIELD

The present disclosure relates to a resin composition and a molded body.

BACKGROUND ART

In the field of polyamide (Nylon) resins, various types of reformations are conducted in accordance with desired properties of molded products such as impact resistance and moldability. Known methods for improving the impact resistance desired for molded products include methods of adjusting the types of polyamide resins and methods of melt-kneading different types of polymers. Known methods for improving the moldability include methods of adjusting the melt viscosity by adding modifiers such as layer silicates and ionomers.

Patent Document 1 discloses improving impact resistance by a polyamide resin composition including a polyamide resin having a high molecular weight and a specific relative viscosity, and a polymer such as an ethylene-(meth)acrylic acid copolymer, an ethylene-(meth)acrylate ester copolymer or an ionomer.

Patent Document 2 discloses, as a polyamide resin composition having an excellent impact resistance, a polyamide resin composition including a polyamide resin, a polyolefin copolymer and an ionomer at specific contents.

Patent Document 3 discloses, as a polyamide resin composition for producing resin films such as food packaging materials, a polyamide composition including a polyamide in which specific contents of an olefin-based elastomer and an ionomer are added for the purpose of improving thermal durability.

When molding a so-called thick material (i.e., a thick molded body) by blow molding or injection molding, it is desired that the melt viscosity is controlled. Since polyamide resins generally have low melt viscosity, drawdown of the parison during blow molding, which leads to lower moldability, becomes an issue. To deal with this matter, methods for suppressing the occurrence of drawdown by increasing the viscosity in the low shear region using modifiers are being explored. Further, in injection molding, inflow of the molten resin into the spaces of the mold may cause development of burrs on the molded products. To reduce the burrs, methods are being explored that increase the viscosity in the low shear region during the cooling solidification while avoiding excessive thickening in the high shear region during the injection filling.

As a method for reforming a polyamide resin in blow molding, for example, Patent Document 4 discloses a method of adding a layer silicate to a polyamide resin to obtain a melt viscosity property suitable for blow molding. Patent Document 5 discloses a polyamide resin composition in which a polyamide 6 resin and a polyamide 610 resin are mixed at a certain ratio to improve the melt tension, with an ionomer and an ethylene-based elastomer being further blended, in an endeavor to improve moldability and low-temperature toughness in blow molding.

RELATED ART DOCUMENTS

Patent Documents

[Patent Document 1] Japanese Patent Application Laid-Open (JP-A) No. S54-28360

[Patent Document 2] JP-A No. S58-29854
[Patent Document 3] International Publication (WO) No. 2017/073559
[Patent Document 4] JP-A No. 2000-154315
[Patent Document 5] JP-A No. 2007-204674

SUMMARY OF INVENTION

Technical Problem

As described above, especially in the molding methods such as blow molding and injection molding, it is desired that polyamide resin compositions have suitable melt viscosity and favorable moldability. However, in a case in which an ionomer resin is used as a modifier for adjusting the viscosity in order to improve moldability, its high thickening effect tends to lead to decreased impact resistance. As such, moldability and impact resistance are in a trade-off relation. Therefore, there is a room for further improvement in achieving both moldability and impact resistance.

In view of the foregoing situation, the present disclosure is directed to providing a resin composition that enables to achieve both excellent moldability and impact resistance, and a molded body thereof.

Solution to Problem

Means for solving the above problems include the following aspects.

(1) A resin composition including: a polyamide resin (A); an ionomer of an ethylene-unsaturated carboxylic acid-based copolymer (B); and an ethylene-based polymer (C),
wherein a content of the polyamide resin (A) is 50% by mass or more with respect to a total amount of the polyamide resin (A), the ionomer of an ethylene-unsaturated carboxylic acid-based copolymer (B) and the ethylene-based polymer (C), and
wherein a content of the ethylene-based copolymer (C) is less than 50% by mass with respect to a total amount of the ionomer of an ethylene-unsaturated carboxylic acid-based copolymer (B) and the ethylene-based polymer (C).

(2) The resin composition according to (1), wherein the content of the ethylene-based polymer (C) is less than 10% by mass with respect to the total amount of the polyamide resin (A), the ionomer of an ethylene-unsaturated carboxylic acid-based copolymer (B) and the ethylene-based polymer (C).

(3) The resin composition according to (1) or (2), wherein a content of the ionomer of an ethylene-unsaturated carboxylic acid-based copolymer (B) is 35% by mass or less with respect to the total amount of the polyamide resin (A), the ionomer of an ethylene-unsaturated carboxylic acid-based copolymer (B) and the ethylene-based polymer (C).

(4) The resin composition according to any one of (1) to (3), wherein the ethylene-based polymer (C) includes an ethylene-unsaturated ester copolymer.

(5) The resin composition according to any one of (1) to (4), wherein a melt flow rate of the ethylene-based polymer (C) is 0.1 to 600 g/10 min., the melt flow rate being measured in accordance with JIS K7210-1:2014 under conditions of 190° C. and a load of 2160 g.

(6) The resin composition according to any one of (1) to (5), wherein a melt flow rate of the ionomer of an ethylene-unsaturated carboxylic acid-based copolymer (B) is 0.1 to 100 g/10 min., the melt flow rate being measured in accordance with JIS K7210-1:2014 under conditions of 190° C. and a load of 2160 g.

(7) The resin composition according to any one of (1) to (6), wherein a content of a structural unit derived from an unsaturated carboxylic acid in the ethylene-unsaturated carboxylic acid-based copolymer of the ionomer of an ethylene-unsaturated carboxylic acid-based copolymer (B) is 5 to 25% by mass with respect to a total amount of the ethylene-unsaturated carboxylic acid-based copolymer.

(8) A molded body, which is a molded product of the resin composition according to any one of (1) to (7).

Advantageous Effects of Invention

According to the present disclosure, a resin composition that enables to achieve both excellent moldability and impact resistance, and a molded body thereof are provided.

DESCRIPTION OF EMBODIMENTS

Embodiments for carrying out the invention will be described below in detail. However, the invention is not limited to the following embodiments. In the following embodiments, components (including elemental steps, etc.) thereof are not essential unless otherwise specified. The same applies to numerical values and ranges, which do not limit the invention.

In the present disclosure, the term "process" does not only mean an independent process, but also includes processes that cannot be clearly distinguished from other processes as long as the intended purpose of the process is achieved.

In the present disclosure, a numerical range specified by way of using the expression "(from) . . . to . . . " includes the numerical values before and after the word "to" as the lower limit value and the upper limit value.

In the numerical ranges described in a stepwise manner in the present disclosure, the upper limit value or the lower limit value described in one numerical range may be replaced with the upper limit value or the lower limit value of another numerical range described in a stepwise manner. Further, in the numerical ranges described in the present disclosure, the upper limit value or the lower limit value of the numerical ranges may be replaced with the values shown in the Examples.

In the present disclosure, each component may include plural substances corresponding thereto. When plural substances corresponding to each component are present in a composition, the content or the amount of each component in a composition means the total content or the total amount of the plural substances present in the composition unless otherwise specified, In the present disclosure, the expression "(meth)acryl" means at least one of acryl or methacryl.

<<Resin Composition>>

A resin composition according to the present disclosure includes: a polyamide resin (A); an ionomer of an ethylene-unsaturated carboxylic acid-based copolymer (B); and an ethylene-based polymer (C), wherein a content of the polyamide resin (A) is 50% by mass or more with respect to a total amount of the polyamide resin (A), the ionomer of an ethylene-unsaturated carboxylic acid-based copolymer (B) and the ethylene-based polymer (C), and wherein a content of the ethylene-based copolymer (C) is less than 50% by mass with respect to a total amount of the ionomer of an ethylene-unsaturated carboxylic acid-based copolymer (B) and the ethylene-based polymer (C).

The resin composition according to the present disclosure enables to obtain a molded body having excellent moldability and impact resistance. The function of the resin composition is presumed as follows, although it is unclear.

The addition of the ionomer of an ethylene-unsaturated carboxylic acid-based copolymer (B) to the polyamide resin (A) can increase the melt viscosity in the low shear region. This is presumably due to an interaction between the "sea" portion (i.e., the portion of the polyamide resin (A)) and the "island" portion (i.e., the portion of the ionomer of an ethylene-unsaturated carboxylic acid-based copolymer (B)) in a sea-island structure in which the ionomer of an ethylene-unsaturated carboxylic acid-based copolymer (B) is dispersed in the polyamide resin (A). The higher the dispersibility of the ionomer of an ethylene-unsaturated carboxylic acid-based copolymer (B) is, the higher the thickening effect becomes. It has been found that, while adjusting the acid content or the metal-ion content of the ionomer of an ethylene-unsaturated carboxylic acid-based copolymer (B) can control the dispersibility, and in particular, while increasing the acid content can improve the dispersibility resulting in improved thickening function, these measures tend to deteriorate the impact resistance.

It was also found that further adding a small amount of the ethylene-based polymer (C) can improve the impact resistance while favorably maintaining the thickening effect of the ionomer of an ethylene-unsaturated carboxylic acid-based copolymer (B) in the low shear region. It was found that this effect can be obtained when the ethylene-based polymer (C) and the ionomer of the ethylene-unsaturated carboxylic acid-based copolymer (B) are added to the polyamide resin (A) at the most suitable blending ratio, and that it is desirable that the addition amount of the ethylene-based polymer (C) is as low as possible in terms of the thickening effect and the impact resistance. In other words, it is preferable that the addition amount of the ethylene-based polymer (C) is as low as possible in terms of the thickening effect since the melt viscosity of the resin composition is lowered in accordance with the addition amount of the ethylene-based polymer (C). Further, in terms of the impact resistance, while the ethylene-based polymer (C) plays a role in relaxing stress upon application of impact, addition of a relatively high amount of the ethylene-based polymer (C) to the polyamide resin (A) to mold the resin composition causes lower dispersibility of the ethylene-based polymer (C) and leads to lower impact resistance, and therefore, the addition amount is preferably limited to a small amount. Further, as the dispersibility decreases, the island structure formed by the ethylene-based polymer (C) tends to be oriented in the direction of the flow of the molten resin during the molding. It is presumed that such orientation of the dispersion phase can inhibit distribution of stress when an impact is applied to the molded body, resulting in lower impact resistance.

In view of the foregoing, it is presumed that the resin composition according to the present disclosure can achieve both favorable moldability and excellent impact resistance by, in consideration of the thickening effect and the impact resistance, adjusting the amount of the ethylene-based polymer (C) such that it becomes lower than the amount of the ionomer of an ethylene-unsaturated carboxylic acid-based copolymer (B), thereby improving the impact resistance while suppressing the lowering of the melt viscosity.

Hereinafter, each component contained in the resin composition according to the present disclosure will be described.

<Polyamide Resin (A)>

The resin composition according to the present disclosure includes a polyamide resin (A). The content of the polyamide resin (A) is 50% by mass or more with respect to the total amount of the polyamide resin (A), the ionomer of an ethylene-unsaturated carboxylic acid-based copolymer (B) and the ethylene-based polymer (C).

The type of polyamide resin (A) is not particularly limited. Examples include: a polycondensate of a dicarboxylic acid, such as oxalic acid, adipic acid, sebacic acid, dodecanoic acid, terephthalic acid, isophthalic acid or 1,4-cyclohexyldicarboxylic acid, and a diamine, such as ethylenediamine, tetramethylenediamine, pentamethylenediamine, hexamethylenediamine, decamethylenediamine, 1,4-cyclohexyldiamine or m-xylenediamine; a ring-opening polymer of a cyclic lactam such as ε-caprolactam or ω-laurolactam; a polycondensate of an aminocarboxylic acid such as 6-aminocaproic acid, 9-aminononanoic acid, 11-aminoundecanoic acid or 12-aminododecanoic acid; and a copolymer of the foregoing cyclic lactam, dicarboxylic acid and diamine. One type of polyamide resin (A) may be used singly, or two or more types thereof may be used in combination.

As the polyamide resin (A), products that are commercially available may be used. Specific examples include Nylon 4, Nylon 6, Nylon 46, Nylon 66, Nylon 610, Nylon 612, Nylon 6T, Nylon 11, Nylon 12, a copolymer nylon (e.g., Nylon 6/66, Nylon 6/12, Nylon 6/610, Nylon 66/12 and Nylon 6/66/610), Nylon MXD6 and Nylon 46.

Among these polyamide resins, Nylon 6 and Nylon 6/12 are preferable from the viewpoint of their availability and improvement in scratch resistance.

The content of the polyamide resin (A) is 50% by mass or more with respect to the total amount of the polyamide resin (A), the ionomer of an ethylene-unsaturated carboxylic acid-based copolymer (B) and the ethylene-based polymer (C). It is presumed that, by setting the content of the polyamide resin (A) in this range, the characteristics of the ionomer of an ethylene-unsaturated carboxylic acid-based copolymer (B) and the ethylene-based polymer (C) can be favorably exhibited, whereby both moldability and impact resistance can be favorably exhibited. From the viewpoint of improving heat resistance and scratch resistance, the content of the polyamide resin (A) is preferably 60% by mass or more, more preferably 70% by mass or more, and further preferably 80% by mass or more, with respect to the total amount of the polyamide resin (A), the ionomer of an ethylene-unsaturated carboxylic acid-based copolymer (B) and the ethylene-based polymer (C). From the viewpoint of obtaining a favorable modification effect, the content is preferably 95% by mass or less, more preferably 90% by mass or less, and further preferably 85% by mass or less.

From the foregoing viewpoints, the content of the polyamide resin (A) is preferably from 50% by mass to 95% by mass, more preferably from 60% by mass to 95% by mass, further preferably from 70% by mass to 90% by mass, and particularly preferably from 80% by mass to 85% by mass.

From the same viewpoints as the foregoing, the content of the polyamide resin (A) with respect the entire resin composition is preferably 50% by mass or more, more preferably 60% by mass or more, further preferably 70% by mass or more, and particularly preferably 80% by mass or more. From the same viewpoints as the foregoing, the content of the polyamide resin (A) with respect to the entire resin composition is preferably 95% by mass or less, more preferably 90% by mass or less, and further preferably 85% by mass or less.

From the foregoing viewpoints, the content of the polyamide resin (A) with respect to the entire resin composition is preferably from 50% by mass to 95% by mass, more preferably from 60% by mass to 95% by mass, further preferably from 70% by mass to 90% by mass, and particularly preferably from 80% by mass to 85% by mass.

<Ionomer of Ethylene-Unsaturated Carboxylic Acid-Based Copolymer (B)>

The resin composition according to the present disclosure includes an ionomer of an ethylene-unsaturated carboxylic acid-based copolymer (B). By including the ionomer of an ethylene-unsaturated carboxylic acid-based copolymer (B) in the resin composition, melt viscosity in the low shear region can be increased, whereby moldability can be improved.

In the present disclosure, an ionomer of an ethylene-unsaturated carboxylic acid-based copolymer refers to a compound in which at least a part of the acid groups of the ethylene-unsaturated carboxylic acid-based copolymer are neutralized with metal ions.

The ethylene-unsaturated carboxylic acid-based copolymer of the ionomer of an ethylene-unsaturated carboxylic acid-based copolymer (B) is a copolymer in which at least ethylene and an unsaturated carboxylic acid have been copolymerized. The copolymer may be a bipolymer in which ethylene and an unsaturated carboxylic acid have been copolymerized, may be a terpolymer in which ethylene, an unsaturated carboxylic acid and a third copolymerization component have been copolymerized, and may be a multi-component copolymer in which another copolymerization component have been further copolymerized.

The ethylene-unsaturated carboxylic acid-based copolymer of the ionomer of an ethylene-unsaturated carboxylic acid-based copolymer (B) may be any of a block copolymer, a random copolymer or a graft copolymer. From the viewpoint of availability, a random bipolymer, a random terpolymer, a graft copolymer of random bipolymers and a graft copolymer of random terpolymers are preferable, and a random bipolymer and a random terpolymer are more preferable.

Since the ionomer of an ethylene-unsaturated carboxylic acid-based copolymer (B) is a compound in which acid groups contained in the ethylene-unsaturated carboxylic acid-based copolymer are neutralized with metal ions, the ethylene-unsaturated carboxylic acid-based copolymer has at least one acid group in the molecule. Examples of the acid group include a carboxy group, a sulfonic acid group and a phosphoric acid group. The acid group may be a carboxy group of the unsaturated carboxylic acid that is a copolymerization component of the ionomer, or may be another acid group.

Examples of the unsaturated carboxylic acid that is a copolymerization component of the ethylene-unsaturated carboxylic acid-based copolymer in the ionomer of an ethylene-unsaturated carboxylic acid-based copolymer (B) include an unsaturated carboxylic acid having 4 to 8 carbon atoms and an acid anhydride thereof, such as (meth)acrylic acid, itaconic acid, itaconic anhydride, fumaric acid, crotonic acid, maleic acid and maleic anhydride. In particular, (meth)acrylic acid is preferable as the unsaturated carboxylic acid.

Examples of the copolymerization component other than ethylene and the unsaturated carboxylic acid in the ionomer of an ethylene-unsaturated carboxylic acid-based copolymer (B) include an unsaturated carboxylate ester (e.g., alkyl (meth)acrylate ester such as methyl (meth)acrylate, ethyl (meth)acrylate, isobutyl (meth)acrylate, n-butyl (meth)acrylate, isooctyl (meth)acrylate, dimethyl maleate and diethyl maleate); an unsaturated hydrocarbon (e.g., propylene, butene, 1,3-butadiene, penten, 1,3-pentadiene and 1-hexene); a vinyl ester (e.g., vinyl acetate and vinyl propionate); an oxide, such as vinyl sulfate and vinyl nitrate; a halogen compound (e.g., vinyl chloride and vinyl fluoride); a vinyl group-containing primary amine compound and a vinyl group-containing secondary amine compound; carbon monoxide; and sulfur dioxide.

Among these copolymerization components, an unsaturated carboxylate ester is preferable.

For example, when the ethylene-unsaturated carboxylic acid-based copolymer in the ionomer of an ethylene-unsaturated carboxylic acid-based copolymer (B) is a terpolymer, preferable examples include a terpolymer of ethylene, an unsaturated carboxylic acid and an unsaturated carboxylate ester, and a terpolymer of ethylene, an unsaturated carboxylic acid and an unsaturated carbohydrate.

Examples of the unsaturated carboxylate ester include an unsaturated alkyl carboxylate ester. The alkyl group of the alkyl ester in the unsaturated alkyl carboxylate ester preferably has 1 to 12 carbon atoms, more preferably 1 to 8 carbon atoms, and further preferably 1 to 4 carbon atoms. Examples of the alkyl group include methyl, ethyl, n-propyl, isopropyl, n-butyl, isobutyl, sec-butyl, 2-ethylhexyl and isooctyl.

Specific examples of the unsaturated carboxylate ester include an unsaturated alkyl carboxylate ester having an alkyl group that has 1 to 12 carbon atoms (e.g., an alkyl (meth)acrylate ester, such as methyl (meth)acrylate, ethyl (meth)acrylate, isobutyl (meth)acrylate, n-butyl (meth)acrylate and isooctyl (meth)acrylate; and an alkyl maleate ester such as dimethyl maleate or diethyl maleate).

Preferable examples of the unsaturated alkyl carboxylate ester include an alkyl (meth)acrylate ester having 1 to 4 carbon atoms at the alkyl moiety.

Preferable examples of the ethylene-unsaturated carboxylic acid-based copolymer of the ionomer of an ethylene-unsaturated carboxylic acid-based copolymer (B) include an ethylene-(meth)acrylic acid copolymer for a bipolymer, and an ethylene-(meth)acrylic acid-(meth)acrylate ester copolymer (e.g., an ethylene-(meth)acrylic acid-methyl (meth)acrylate copolymer, an ethylene-(meth)acrylic acid-ethyl (meth)-acrylate copolymer, an ethylene-(meth)acrylic acid-isobutyl (meth)acrylate copolymer, and an ethylene-(meth)acrylic acid-n-butyl (meth)acrylate copolymer). One type of ionomer of an ethylene-unsaturated carboxylic acid-based copolymer (B) may be used singly, or two or more types thereof may be used in combination.

The content of the structural unit derived from the unsaturated carboxylic acid contained in the ethylene-unsaturated carboxylic acid-based copolymer in the ionomer of an ethylene-unsaturated carboxylic acid-based copolymer (B) is preferably from 5% by mass to 25% by mass, more preferably from 10% by mass to 25% by mass, and further preferably from 15% by mass to 25% by mass, with respect to the entire copolymer. The content of the structural unit derived from the unsaturated carboxylic acid of 5% by mass or more is advantageous in terms of the impact resistance of the molded body and the thickening effect. Further, the content of the structural unit derived from the unsaturated carboxylic acid of 25% by mass or less is advantageous in terms of industrial availability.

When the ethylene-unsaturated carboxylic acid-based copolymer is a terpolymer of ethylene, an unsaturated carboxylic acid and an unsaturated carboxylate ester, the content of the structural unit derived from the unsaturated carboxylate ester in the terpolymer is preferably from 3% by mass to 25% by mass, and more preferably from 5% by mass to 20% by mass, from the viewpoint of ensuring flexibility. The content of the structural unit derived from the unsaturated carboxylate ester of 3% by mass or more is advantageous in terms of ensuring flexibility, and the content of 25% by mass or less is advantageous in terms of preventing blocking.

Examples of the metal ions used for neutralizing the acid group include metal ions such as lithium ions, sodium ions, potassium ions, rubidium ions, cesium ions, zinc ions, magnesium ions and manganese ions. In particular, from the viewpoint of availability, zinc ions, magnesium ions and sodium ions are preferable, zinc ions and sodium ions are more preferable, and zinc ions are further preferable. The valence of the metal ions is not particularly limited, and a divalent metal ions are preferable from the viewpoint of achieving favorable improvement in impact resistance and a favorable thickening effect. One type of metal ions for neutralizing the acid groups may be used, or two or more types thereof may be used.

In the ionomer of an ethylene-unsaturated carboxylic acid-based copolymer (B), the degree of neutralization of the ethylene-unsaturated carboxylic acid-based copolymer is preferably 10% by mole to 85% by mole. In terms of the thickening effect, when the degree of neutralization is 10% by mole or more, the dispersibility of the ionomer of an ethylene-unsaturated carboxylic acid-based copolymer (B) is improved, whereby a more favorable thickening effect tends to be obtained. Further, in terms of improving the impact resistance, it is preferable that the degree of neutralization is high and that the amount of the metal ions is large. Further, the degree of neutralization of 85% by mole or less tends to enable excellent processability and moldability. The degree of neutralization is more preferably from 15% by mole to 82% by mole, and further preferably from 30% by mole to 75% by mole.

The degree of neutralization is the blended ratio (% by mole) of the carboxy groups neutralized by the metal ions to the number of moles of the acid groups, in particular, carboxy groups, of the ethylene-unsaturated carboxylic acid-based copolymer.

The content of the ionomer of an ethylene-unsaturated carboxylic acid-based copolymer (B) is preferably 35% by mass or less, more preferably 25% by mass or less, and further preferably 20% by mass or less, with respect to the total amount of the polyamide resin (A), the ionomer of an ethylene-unsaturated carboxylic acid-based copolymer (B) and the ethylene-based polymer (C). The content of 35% by mass or less tends to improve moldability owing to the thickening effect, and tends to enable to obtain favorable impact resistance as a result of the combined use with the ethylene-based polymer (C).

Further, the content of the ionomer of an ethylene-unsaturated carboxylic acid-based copolymer (B) is preferably 5% by mass or more, more preferably 10% by mass or more, and further preferably 15% by mass or more, with respect to the total amount of the polyamide resin (A), the ionomer of an ethylene-unsaturated carboxylic acid-based copolymer (B) and the ethylene-based polymer (C), from the viewpoint of improving moldability.

The content of the ionomer of an ethylene-unsaturated carboxylic acid-based copolymer (B) is preferably from 5% by mass to 35% by mass, more preferably from 10% by mass to 25% by mass, and further preferably from 15% by mass to 20% by mass, with respect to the total amount of the polyamide resin (A), the ionomer of an ethylene-unsaturated carboxylic acid-based copolymer (B) and the ethylene-based polymer (C).

The content of the ionomer of an ethylene-unsaturated carboxylic acid-based copolymer (B) is preferably 35% by mass or less, more preferably 25% by mass or less, and further preferably 20% by mass or less, with respect to the total amount of the resin composition. The content of 35% by mass or less tends to improve moldability by the thickening effect, and tends to enable to obtain favorable impact resistance as a result of the combined use with the ethylene-based polymer (C).

Further, the content of the ionomer of an ethylene-unsaturated carboxylic acid-based copolymer (B) is preferably 5% by mass or more, more preferably 10% by mass or more, and further preferably 15% by mass or more, with respect to the total amount of the resin composition, from the viewpoint of improving moldability.

The content of the ionomer of an ethylene-unsaturated carboxylic acid-based copolymer (B) is preferably from 5% by mass to 35% by mass, more preferably from 10% by mass to 25% by mass, and further preferably from 15% by mass to 20% by mass, with respect to the total amount of the resin composition.

The melt flow rate (MFR) of the ionomer of an ethylene-unsaturated carboxylic acid-based copolymer (B) is preferably from 0.1 g/10 min. to 100 g/10 min., more preferably from 0.1 g/10 min. to 60 g/10 min., and further preferably from 0.1 g/10 min. to 30 g/10 min., the melt flow rate being measured in accordance with JIS K7210-1:2014 under conditions of 190° C. and a load of 2160 g, from the viewpoints of flowability and moldability. The MFR of the ionomer of an ethylene-unsaturated carboxylic acid-based copolymer (B) may be adjusted by blending plural ionomers of an ethylene-unsaturated carboxylic acid-based copolymer having different MFRS.

<Ethylene-Based Polymer (C)>

The resin composition according to the present disclosure includes an ethylene-based polymer (C). In the present disclosure, an ethylene-based polymer (C) refers to an ethylene polymer and a copolymer, the main component of which is ethylene (i.e., the ethylene component is contained at 50% by mass or more), and which is not the ionomer of an ethylene-unsaturated carboxylic acid-based copolymer (B). In the present disclosure, the ethylene-based polymer (C) does not include an ethylene-based polymer modified with a substance that reacts with a polyamide resin to form a covalent bond (e.g., an unsaturated carboxylic acid or an anhydride thereof, such as acrylic acid, methacrylic acid, maleic acid or maleic anhydride).

From the viewpoints of the thickening effect and the impact resistance, the melt flow rate (MFR) of the ethylene-based polymer (C) is preferably from 0.1 g/10 min. to 600 g/10 min., more preferably from 0.1 g/10 min. to 300 g/10 min., and further preferably from 0.1 g/10 min. to 100 g/10 min., the melt flow rate being measured in accordance with JIS K7210-1:2014 under conditions of 190° C. and a load of 2160 g. The MFR of the ethylene-based polymer (C) may be adjusted by blending plural ethylene-based polymers (C) having different MFRS.

More specifically, examples of the ethylene-based polymer (C) include: an ethylene homopolymer; an ethylene-α-olefin copolymer that is a copolymer of ethylene and an α-olefin having 3 to 20 carbon atoms (e.g., propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene); and an ethylene-unsaturated ester copolymer. One type of ethylene-based polymer (C) may be used singly, or two or more types thereof may be used in combination. In particular, an ethylene-unsaturated ester copolymer is preferable from the viewpoint of the balance between the thickening effect and the impact resistance of the molded body. Hereinafter, the ethylene-unsaturated ester copolymer will be described in detail.

—Ethylene-Unsaturated Ester Copolymer—

An ethylene-unsaturated ester copolymer is a copolymer of ethylene and an unsaturated ester. One type of unsaturated ester may be used singly, or two or more types thereof may be used in combination. The ethylene-unsaturated ester copolymer preferably includes at least one selected from the group consisting of an ethylene-vinyl ester copolymer and an ethylene-unsaturated carboxylate ester copolymer, and more preferably includes an ethylene-unsaturated carboxylate ester.

The ethylene-unsaturated ester copolymer may contain a polymerizable monomer other than the ethylene and the unsaturated ester as a copolymerization component. Examples of the polymerizable monomer other than the ethylene and the unsaturated ester include an olefin such as propylene, butene or hexene.

The ethylene-vinyl ester copolymer is a copolymer of ethylene and a vinyl ester. One type of vinyl ester may be used singly, or two or more types thereof may be used in combination. The ethylene-vinyl ester copolymer may be a bipolymer in which ethylene and a vinyl ester are the copolymerization components, or may be a multi-component copolymer in which ethylene, vinyl ester and another copolymerization component have been copolymerized.

Examples of the ethylene-vinyl ester copolymer include at least one selected from the group consisting of an ethylene-vinyl acetate copolymer, an ethylene-vinyl propionate copolymer, an ethylene-vinyl butyrate copolymer, an ethylene-vinyl stearate copolymer and the like.

An ethylene-unsaturated carboxylate ester copolymer is a copolymer of ethylene and an unsaturated carboxylate ester. One type of unsaturated carboxylate ester may be used singly, or two or more types thereof may be used in combination. The ethylene-unsaturated carboxylate ester copolymer may be a bipolymer in which ethylene and an unsaturated carboxylate ester are the copolymerization components, or may be a multi-component copolymer in which ethylene, an unsaturated carboxylate ester and another copolymerization component have been copolymerized.

Examples of the ethylene-unsaturated carboxylate ester copolymer include a copolymer containing ethylene and an unsaturated alkyl carboxylate ester as copolymerization components.

Examples of the unsaturated carboxylic acid of the unsaturated carboxylate ester in the ethylene-unsaturated carboxylate ester copolymer include an unsaturated carboxylic acid and an anhydride thereof such as (meth)acrylic acid, 2-ethyl (meth)acrylic acid, crotonic acid, maleic acid, fumaric acid, itaconic acid, maleic anhydride, itaconic anhydride, monomethyl maleate and monoethyl maleate. In particular, the unsaturated carboxylic acid preferably includes (meth)acrylic acid from the viewpoint of productivity and hygiene and the like of the ethylene-unsaturated ester copolymer. One type of unsaturated carboxylic acid may be used singly, or two or more types thereof may be used in combination.

Examples of the alkyl group of the unsaturated alkyl carboxylate ester in the ethylene-unsaturated carboxylate ester copolymer include an alkyl group having 1 to 12 carbon atoms, and more specifically, an alkyl group such as methyl, ethyl, n-propyl, isopropyl, n-butyl, isobutyl, sec-butyl, 2-ethylhexyl and isooctyl. The alkyl group of the alkyl ester in the unsaturated alkyl carboxylate ester preferably has 1 to 8 carbon atoms, and more preferably has 1 to 4 carbon atoms.

Preferable examples of the unsaturated carboxylate ester of the ethylene-unsaturated carboxylate ester copolymer include at least one selected from (meth)acrylate esters such as methyl (meth)acrylate, ethyl (meth)acrylate, isopropyl (meth)acrylate, n-propyl (meth)acrylate, isobutyl (meth)acrylate, n-butyl (meth)acrylate, isooctyl (meth)acrylate, and 2-ethylhexyl (meth)acrylate. One type of unsaturated carboxylate ester may be used singly, or two or more types thereof may be used in combination. In particular, methyl (meth)acrylate, ethyl (meth)acrylate, isopropyl (meth)acrylate, n-propyl (meth)acrylate, isobutyl (meth)acrylate and n-butyl (meth)acrylate are preferable.

Preferable examples of the ethylene-unsaturated carboxylate ester copolymer include an ethylene-(meth)acrylate ester copolymer. One type of (meth)acrylate ester, which is a copolymerization component, may be used singly, or two or more types thereof may be used in combination. An ethylene-unsaturated carboxylate ester copolymer in which one type of (meth)acrylate ester is used is preferable. Examples of the ethylene-unsaturated carboxylate ester copolymer include an ethylene-methyl (meth)acrylate copolymer, an ethylene-ethyl (meth)acrylate copolymer, an ethylene-isopropyl (meth)acrylate copolymer, an ethylene-n-propyl (meth)acrylate copolymer, an ethylene-isobutyl (meth)acrylate copolymer, an ethylene-n-butyl (meth)acrylate copolymer, an ethylene-isooctyl (meth)acrylate copolymer and an ethylene-2-ethylhexyl (meth)acrylate copolymer. In particular, an ethylene-ethyl (meth)acrylate copolymer is preferable, and an ethylene-acrylate copolymer is more preferable.

It is preferable that the ethylene-unsaturated ester copolymer includes at least one selected from the group consisting of an ethylene-vinyl acetate copolymer, an ethylene-methyl (meth)acrylate copolymer, an ethylene-ethyl (meth)acrylate copolymer, an ethylene-isopropyl (meth)acrylate copolymer, an ethylene-n-propyl (meth)acrylate copolymer, an ethylene-isobutyl (meth)acrylate copolymer and an ethylene-n-butyl (meth)acrylate copolymer.

One type of ethylene-unsaturated ester copolymer may be used singly, or two or more types thereof may be used in combination.

The melt flow rate (MFR) of the ethylene-unsaturated ester copolymer is preferably from 0.1 g/10 min. to 600 g/10 min., more preferably from 0.1 g/10 min. to 300 g/10 min., and further preferably from 0.1 g/10 min. to 100 g/10 min., the melt flow rate being measured in accordance with JIS K7210-1:2014 under conditions of 190° C. and a load of 2160 g, from the viewpoints of the thickening effect and the impact resistance. The MFR of the ethylene-unsaturated ester copolymer may be adjusted by blending plural ethylene-unsaturated ester copolymers having different MFRS.

In the ethylene-unsaturated ester copolymer, the content of the structural unit derived from ethylene with respect to all the structural units that constitute the ethylene-unsaturated ester copolymer is preferably from 50% by mass to 95% by mass, more preferably from 60% by mass to 93% by mass, and further preferably from 62% by mass to 92% by mass. The content of the ethylene-derived structural unit within these ranges is beneficial in improving the impact resistance.

In the ethylene-unsaturated ester copolymer, the content of the structural unit derived from the unsaturated ester with respect to all the structural units that constitute the ethylene-unsaturated ester copolymer is preferably from 5% by mass to 50% by mass, more preferably from 7% by mass to 40% by mass, and further preferably from 8% by mass to 38% by mass. The content of the constituent unit derived from the unsaturated ester within these ranges is beneficial in improving the impact resistance.

The method for producing the ethylene-unsaturated ester copolymer is not particularly limited, and the ethylene-unsaturated ester copolymer can be produced by known methods. For example, the ethylene-unsaturated ester copolymer can be obtained by radical copolymerization of the polymerization components at a high temperature under high pressure. Further, products that are commercially available may be used as the ethylene-unsaturated ester copolymer.

—Content of Ethylene-based Polymer (C)—

In the resin composition according to the present disclosure, the content of the ethylene-based polymer (C) with respect to the total amount of the ionomer of an ethylene-unsaturated carboxylic acid-based copolymer (B) and the ethylene-based polymer (C) is less than 50% by mass. The content is preferably 40% by mass or less, more preferably 30% by mass or less, and further preferably 20% by mass or less. It is presumed that, by the content being less than 50% by mass, orientation of the ethylene-based polymer (C) during the molding of the resin composition can be suppressed, whereby the effect of improving impact resistance can be favorably obtained even when the ionomer of an ethylene-unsaturated carboxylic acid-based copolymer (B) is added.

Further, from the viewpoint of favorably obtaining the effect of impact resistance of the molded body, the content of the ethylene-based polymer (C) with respect to the total amount of the ionomer of an ethylene-unsaturated carboxylic acid-based copolymer (B) and the ethylene-based polymer (C) is preferably 5% by mass or more. In order to suppress the decrease in the thickening effect caused by the ethylene-based polymer (C), it is preferable that the content of the ethylene-based polymer (C) is small.

From the foregoing viewpoints, the content of the ethylene-based polymer (C) with respect to the total amount of the ionomer of an ethylene-unsaturated carboxylic acid-based copolymer (B) and the ethylene-based polymer (C) is preferably from 5% by mass to less than 50% by mass, more preferably from 5% by mass to 40% by mass, further preferably from 5% by mass to 30% by mass, and particularly preferably from 5% by mass to 20% by mass. The content of the ethylene-based polymer (C) is preferably less than 10% by mass, more preferably 8% by mass or less, further preferably 6% by mass or less, and particularly preferably 4% by mass or less, with respect to the total amount of the polyamide resin (A), the ionomer of an ethylene-unsaturated carboxylic acid-based copolymer (B) and the ethylene-based polymer (C). It is presumed that, when the content is less than 10% by mass, dispersibility of the ethylene-based polymer (C) in the polyamide resin (A) is improved, whereby the effect of improving impact resistance can be favorably obtained even when the ionomer of an ethylene-unsaturated carboxylic acid-based copolymer (B) is added.

Further, from the viewpoint of favorably obtaining the effect of impact resistance of the molded body, the content of the ethylene-based polymer (C) with respect to the total amount of the polyamide resin (A), the ionomer of an ethylene-unsaturated carboxylic acid-based copolymer (B) and the ethylene-based polymer (C) is preferably 1% by mass or more.

From the foregoing viewpoints, the content of the ethylene-based polymer (C) with respect to the total amount of the polyamide resin (A), the ionomer of an ethylene-unsaturated carboxylic acid-based copolymer (B) and the ethylene-based polymer (C) is preferably from 1% by mass to less than 10% by mass, more preferably from 1% by mass to 8% by mass, further preferably from 1% by mass to 6% by mass, and particularly preferably from 1% by mass to 4% by mass.

The content of the ethylene-based polymer (C) with respect to the total amount of the resin composition is preferably less than 10% by mass, more preferably 8% by mass or less, further preferably 6% by mass or less, and particularly preferably 4% by mass or less. It is presumed that, when the content is less than 10% by mass, dispersibility of the ethylene-based polymer (C) in the polyamide resin (A) is improved, whereby the effect of improving impact resistance can be favorably obtained even when the ionomer of an ethylene-unsaturated carboxylic acid-based copolymer (B) is added.

Further, from the viewpoint of favorably obtaining the effect of impact resistance of the molded body, the content of the ethylene-based polymer (C) with respect to the total amount of the resin composition is preferably 1% by mass or more.

From the foregoing viewpoints, the content of the ethylene-based polymer (C) with respect to the total amount of the resin composition is preferably from 1% by mass to less than 10% by mass, more preferably from 1% by mass to 8% by mass, further preferably from 1% by mass to 6% by mass, and particularly preferably from 1% by mass to 4% by mass.

<Other Additives>

Various kinds of additives may be added to the resin composition according to the present disclosure as long as the effect of the present disclosure is not impaired. Examples of an additive include an antioxidant, a heat stabilizer, a light stabilizer, a UV absorber, a pigment, a dye, a lubricant, an antiblocking agent, a fungicide, an antibacterial agent, a flame retardant, a flame retardant aid, a cross-linking agent, a cross-linking aid, a foaming agent, a foaming aid, an inorganic filler, a fiber reinforcing material and an antistatic agent. The additive may be added during the preparation of the resin composition, or may be added after the preparation. Further, the additive may be blended in advance with the polyamide resin (A), the ionomer of an ethylene-unsaturated carboxylic acid-based copolymer (B) or the ethylene-based polymer (C).

<Method of Preparing Resin Composition>

The method of producing the resin composition is not particularly limited. For example, the resin composition can be produced by a method of uniformly dry-blending the components at a specific ratio using a tumbler or a mixer, a method of melt-kneading the mixture obtained by the dry-blending using a melt-kneader, or a method of kneading part of the components using a melt-kneader and dry-blending the resultant with the rest of the components. The melt-kneading can be performed using a kneader such as a single-screw extruder, a twin-screw extruder, a kneader, or a Banbury mixer.

<<Molded Body>>

The molded body according to the present disclosure is a molded product of the resin composition according to the present disclosure described above. The molding method and the shape of the molded body are not particularly limited, and any kind of molding method, such as extrusion molding, injection molding, compression molding or blow molding, may be employed to obtain a molded body having any shape. In particular, the resin composition according to the present disclosure is suitable for blow molding and injection molding from the viewpoint of favorable melt viscosity in the low shear region.

EXAMPLES

Hereinafter, the present invention will be specifically described with reference to examples; however, the scope of the present invention is not limited to the specific examples described below.

The raw materials of the resin compositions of the Examples and the Comparative Examples are shown below.

Polyamide Resin (A)
a1) Nylon 6 (trade name 1022B, manufactured by Ube Industries, Ltd., relative viscosity 3.4, melting point 215° C. to 225° C.)

Ionomer of Ethylene-Unsaturated Carboxylic Acid-based Copolymer (B)
b1) An Zn-type ionomer in which 45% by mole of the carboxy groups of the methacrylic acid that constitutes an ethylene-methacrylic acid copolymer (ethylene: methacrylic acid (mass ratio)=80:20, MFR =60 g/10 min.) are neutralized with the metal ions. Abbreviated in Table 1 as "Zn—IO (20% MAA, 45% neutralization)". The number of moles of the zinc (II) ions with respect to 1 kg of the ethylene-methacrylic acid copolymer before the neutralization (hereinafter referred to as Zn amount) was 0.52 mol/kg.

b2) An Zn-type ionomer in which 59% by mole of the carboxy groups of the methacrylic acid that constitutes an ethylene-methacrylic acid copolymer (ethylene: methacrylic acid (mass ratio) =85:15, MFR=60 g/10 min.) are neutralized with the metal ions. Abbreviated in Table 1 as "Zn—IO (15% MAA, 59% neutralization)". The Zn amount was 0.52 mol/kg.

Ethylene-Based Polymer (C)
c1) Ethylene-ethyl acrylate copolymer (ethylene:ethyl acrylate (mass ratio)=66:34, MFR=25 g/10 min.). Abbreviated in Table 1 as "EEA (34% EA, MFR25)".

Example 1

The polyamide resin (A), the ionomer of an ethylene-unsaturated carboxylic acid-based copolymer (B) and the ethylene-based polymer (C) were dry-blended at the mass ratio shown in Table 1, followed by melt-kneading with a 30 mmφ twin-screw extruder at a cylinder temperature of 250° C., whereby the resin composition was obtained. The obtained resin composition was pelletized, dried overnight in a nitrogen atmosphere at 75° C., and then dried at 120° C. for 3 hours. In Table 1, "-" indicates that the component is not blended.

[Evaluation of Melt Viscosity]

Melt viscosities [Pa·s] of the obtained pellet at 250° C. at the shear rates of 13.7 sec$^{-1}$ and 1374 sec$^{-1}$ ($\eta_{13.7}$ and $\eta_{1374}$) were measured using a capillary rheometer in compliance with JIS K7199: 1999. The results are shown in Table 1.

[Evaluation of Impact Resistance]

A test piece having a length of 64 mm, a thickness of 12.7 mm and a width of 3.2 mm was produced by injection-molding at 260° C., and was subjected to the Izod impact strength test in accordance with JIS K7110:1999. The test was conducted by making a notch having a depth of 2.54 mm and a tip radius of 0.25 mm in the test piece. The results are shown in Table 1.

Examples 2 and 3, Comparative Examples 1 to 4

Resin compositions were obtained under the same conditions as in Example 1 except that the types and the blending ratios of the polyamide resin (A), the ionomer of an ethylene-unsaturated carboxylic acid-based copolymer (B) and the ethylene-based polymer (C) were changed as shown in Table 1. Melt viscosities and Izod impact values were measured using the obtained resin compositions. The results are shown in Table 1.

TABLE 1

|  | Example 1 | Example 2 | Example 3 | Comparative Example 1 | Comparative Example 2 | Comparative Example 3 | Comparative Example 4 |
|---|---|---|---|---|---|---|---|
| a1) Nylon 6 | 80 | 80 | 80 | 100 | 80 | 80 | 80 |
| b1) Zn-IO (20% MAA, 45% neutralization) | 17.5 | 15 | — | — | 20 | — | 10 |
| b2) Zn-IO (15% MAA, 59% neutralization) | — | — | 15 | — | — | 20 | — |
| c1) EEA (34% EA, MFR 25) | 2.5 | 5 | 5 | — | — | — | 10 |
| $\eta_{13.7}$[Pa·s] | 5719 | 4412 | 2408 | 1075 | 7399 | 3515 | 2896 |
| $\eta_{1374}$[Pa·s] | 418 | 374 | 275 | 317 | 475 | 334 | 275 |
| $\eta_{13.74}/\eta_{1374}$ | 13.7 | 11.8 | 8.7 | 3.4 | 15.6 | 10.5 | 10.5 |
| Izod Impact Value [J/m] ⅛", 23° C. | 1005 | 869 | 856 | 49 | 158 | 189 | 201 |

As shown in Table 1, favorable melt viscosities at the low shear region ($\eta_{13.7}$) and favorable impact resistance were obtained in Examples 1 to 3. On the other hand, Comparative Example 1, which contains neither an ionomer of an ethylene-unsaturated carboxylic acid-based copolymer (B) or an ethylene-based polymer (C), resulted in having low melt viscosities at the low shear region and inferior impact resistance. Further, Comparative Examples 2 and 3, which do not contain an ethylene-based polymer (C), resulted in having inferior impact resistance. In addition, Comparative Example 4, which contains the ionomer of an ethylene-unsaturated carboxylic acid-based copolymer (B) and the ethylene-based polymer (C), the amount of the ethylene-based polymer (C) being 10 parts, resulted in having inferior impact resistance as compared to the Examples.

In the Izod impact strength test, ductile fractures were observed in Examples 1 and 2, whereas brittle fractures were observed in the other Examples and Comparative Examples. This indicates that the impact resistance was particularly favorable in Examples 1 and 2.

The disclosure of Japanese Patent Application No. 2019-058840 is incorporated herein by reference in its entirety.

All documents, patent applications, and technical standards described in the present disclosure are incorporated by reference in the present disclosure to the same extent as if the individual documents, patent applications, and technical standards were specifically and individually stated to be incorporated by reference.

The invention claimed is:

1. A resin composition comprising:
   a polyamide resin (A);
   an ionomer of an ethylene-unsaturated carboxylic acid-based copolymer (B); and
   an ethylene-based polymer (C) that is not the ionomer of an ethylene-unsaturated carboxylic acid-based copolymer (B),
   wherein the content of the polyamide resin (A) is 50% by mass or more with respect to the total amount of the polyamide resin (A), the ionomer of an ethylene-unsaturated carboxylic acid-based copolymer (B) and the ethylene-based polymer (C),
   wherein the content of the ethylene-based copolymer (C) is less than 50% by mass with respect to the total amount of the ionomer of an ethylene-unsaturated carboxylic acid-based copolymer (B) and the ethylene-based polymer (C),
   wherein the content of the ethylene-based polymer (C) is from more than 0% by mass to 2.5% by mass with respect to the total amount of the resin composition,
   wherein the ethylene-based polymer (C) comprises an ethylene-unsaturated ester copolymer, and
   wherein the polyamide resin (A) is at least one selected from the group consisting of Nylon 4, Nylon 6, Nylon 46, Nylon 66, Nylon 610, Nylon 612, Nylon 11, Nylon 12, and a copolymer thereof.

2. The resin composition according to claim 1, wherein the content of the ionomer of an ethylene-unsaturated carboxylic acid-based copolymer (B) is 35% by mass or less with respect to the total amount of the polyamide resin (A), the ionomer of an ethylene-unsaturated carboxylic acid-based copolymer (B) and the ethylene-based polymer (C).

3. The resin composition according to claim 1, wherein the melt flow rate of the ethylene-based polymer (C) is 0.1 to 600 g/10 min., the melt flow rate being measured in accordance with JIS K7210-1:2014 under conditions of 190° C. and a load of 2160 g.

4. The resin composition according to claim 1, wherein the melt flow rate of the ionomer of an ethylene-unsaturated carboxylic acid-based copolymer (B) is 0.1 to 100 g/10 min., the melt flow rate being measured in accordance with JIS K7210-1:2014 under conditions of 190° C. and a load of 2160 g.

5. The resin composition according to claim 1, wherein the content of a structural unit derived from an unsaturated carboxylic acid in the ethylene-unsaturated carboxylic acid-based copolymer of the ionomer of an ethylene-unsaturated carboxylic acid-based copolymer (B) is 5 to 25% by mass with respect to the total amount of the ethylene-unsaturated carboxylic acid-based copolymer.

6. A molded body, which is a molded product of the resin composition according to claim 1.

* * * * *